UNITED STATES PATENT OFFICE.

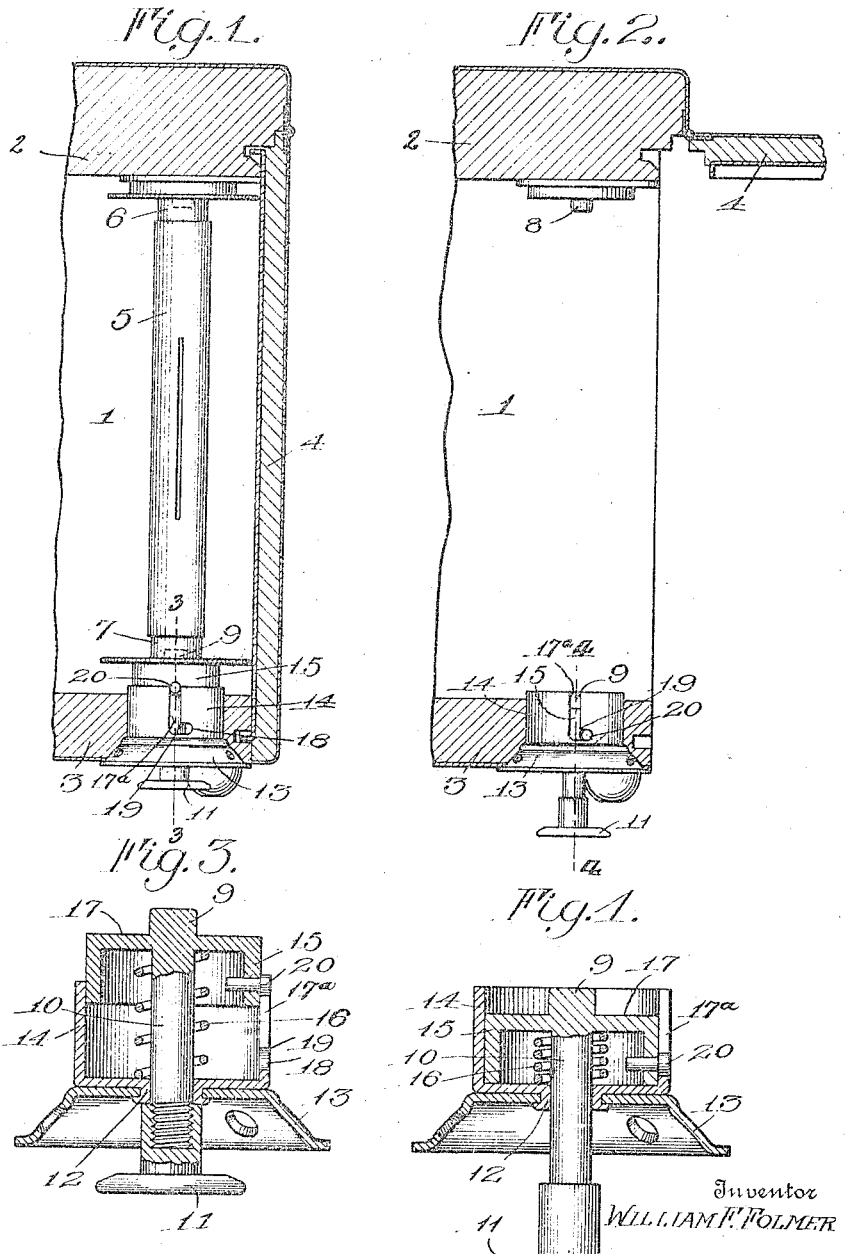

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

FILM-SPOOL CENTER.

1,186,653. Specification of Letters Patent. Patented June 13, 1916.

Application filed December 9, 1911. Serial No. 664,729.

*To all whom it may concern:*

Be it known that I, WILLIAM F. FOLMER, of Rochester, in the county of Monroe and State of New York, have invented certain new and useful Improvements in Film-Spool Centers; and I do hereby declare the following to be a full, clear, and exact description of the same, reference being had to the accompanying drawings, forming a part of this specification, and to the reference-numerals marked thereon.

My present invention relates to photography and more particularly to photographic film cameras or roll holders, and it has for its object to provide a simple, cheap and convenient center for journaling the film spool in such manner as to permit its ready removal and replacement.

A further object of the invention is to so construct the center that it may be easily locked in its retracted or releasing position, particularly when of the spring-actuated type, so that the operator is not obliged to hold on to it while manipulating the film spool, and a still further object of the invention is to provide an improved structure by the use of which but one of the two centers or journals need be retracted to release the spool.

To these and other ends the invention consists in certain improvements and combinations of parts, all as will be hereinafter more fully described, the novel features being pointed out in the claim at the end of the specification.

In the drawings: Figure 1 is a sectional view through the film chamber of a camera or roll holder showing in side elevation a center constructed in accordance with and illustrating one embodiment of my invention, the same being in its inward or operative position and in engagement with a spool; Fig. 2 is a similar view showing the center retracted and the spool removed; Fig. 3 is a longitudinal section through the center, taken substantially on the line 3—3 of Fig. 1, and Fig. 4 is a similar view, taken substantially on the line 4—4 of Fig. 2.

Similar reference numerals throughc the several figures indicate the same part.

The present invention can be practised to the best advantage in connection with the dead or non-rotative centers, I believe, though features thereof are adapted for use in the winding centers as well, and I have, therefore, illustrated in a fragmentary way the feeding film chamber 1 of a roll holder or camera inclosed by what are, in the present instance, top and bottom walls 2 and 3 and accessible through a door 4, usually at the back of the camera. The spool 5 may be of the usual type having the customary circular recesses 6 and 7 at its opposite ends to receive the short cylindrical centers 8 and 9, respectively. The center 8 is, in the present instance, stationary and fixed to the upper wall 2 so that when the spool 5 is to be removed, the opposite center 7 is displaced to permit of sufficient longitudinal movement of the spool to allow of its attachment to both centers. To this end, the center 9 is carried at the inner end of a stem 10 having a finger portion or head 11 projecting to and accessible from the exterior of the camera or roll holder casing. This stem is journaled at 12 to rotate and also move longitudinally with a straight non-rotative movement in a socket piece comprising a mounting plate 13, preferably dished or recessed to give room for the operator's fingers above the finger piece 11 and preferably set into the wall 3, and also a cup-shaped portion 14 secured thereto and projecting at its open side toward the interior of the film chamber 1. The two parts are secured together, in the present instance, by a collar on the cup 14 that forms the beforementioned journal 12 and is turned over on the plate 13. The stem 10 is also provided with a cup-shaped portion 15, reversed with respect to the portion 14 and coöperating telescopically therewith so as to move into and out of the same, as a guide, as the stem moves longitudinally. Within the two cups is housed a spring 16 surrounding the stem 10, as shown in Fig. 3, and having a tendency to move the latter inwardly and to hold the center 9 at the inner end thereof in operative position or in engagement with the spool 5, as shown in Fig. 1, and as the spring is still under compression during such engagement, the shoulder 17, formed by the cup-shaped portion 15 adjacent to the center 9, engages the flange or end of the spool 5 with a yielding pressure that is designed to prevent the film from over-running as it is drawn from the spool.

It will be observed that the cup-shaped portions 14 and 15 effectually house the spring, ample room being left for it within the cup 15 when the stem is retracted to its full extent and the spring is compressed, as shown in Fig. 4, and yet a relatively great length of movement is provided the stem 10 and the center 9, carried thereby, during all of which the stem is accurately guided so that the spool 5 may be released, as before indicated, solely by the movement of the one center 9, the other center 8 being fixed or stationary.

It is desirable that the operator be not obliged to hold the stem 10 in the retracted position of Figs. 2 and 4 against the tension of the spring 16 in order that he may be able to devote his entire attention and both hands to the manipulation of the film spool and other parts during such operations as the interchanging of spools, and I, therefore, provide means for locking the stem in such retracted position by a slight change in the normal positions of the parts that they may be readily made to assume. To this end, one of the cup-shaped portions, preferably the socket piece 14, is provided with a straight longitudinal slot 17$^a$ having a lateral extension 18 that forms a locking shoulder or abutment 19, while the other member 15 carries a pin or abutment 20, fixed, in the present instance, with relation to the stem 10, that traverses the slot 17$^a$ during the longitudinal movement of the stem between its inward and retracted positions. If at the end of the retracting movement, however, the stem 10 is given a slight rotary movement, the pin 20, being in alinement with the extension 18 of the slot, will move into engagement with the locking shoulder 19 and prevent a return movement of the stem until a reverse rotary movement is imparted thereto so that the spring is held depressed and the center 9 is held retracted within the cup 14 of the socket and plenty of room is allowed for the insertion of the spool 5 and the engagement of the fixed center 8 with the recess 6 at the opposite end thereof.

Attention is called to the fact that when the stem is in its inward or operative position the first act of withdrawing it necessitates simply a direct pull on the finger piece 11 and by the time the pin 20 is in alinement with the extension 18 of the slot and a rotary movement is required, sufficient of the stem is accessible from the exterior of the camera to give a good purchase for the fingers of the operator in effecting the rotation.

I claim as my invention:

The combination with the film chamber of a roll holding camera and a socket piece having a cup-shaped portion mounted in a wall of said chamber and opening inwardly, of a longitudinally movable stem journaled in the socket piece and having a head projecting from the chamber wall exteriorly of the camera and spaced from the socket piece in all positions, and also having an inverted cup-shaped portion telescopically engaging that of the socket piece and opening outwardly, one of said telescopic portions being provided with a longitudinal slot and an adjacent locking shoulder at the outer end thereof, a spool center on the stem projecting beyond the bottom of the inverted cup-shaped portion, a fixed spool center on the opposite wall of the chamber, a film spool rotatably mounted on the centers and having recesses in its ends to receive the latter, an abutment on the other cup-shaped portion arranged to traverse the slot as the stem is moved longitudinally between an inward spool engaging position and a retracted position wherein the spool is released and to coöperate with the locking shoulder by a rotary movement of the stem to retain the latter in retracted position, and a spring housed within the cup-shaped portions and normally tending to move the stem inwardly.

WILLIAM F. FOLMER.

Witnesses:
F. F. CHURCH,
FLORENCE E. FRANCK.